United States Patent [19]

Otsubo et al.

[11] Patent Number: 4,880,896

[45] Date of Patent: Nov. 14, 1989

[54] POLYCARBONATE FOR DISC SUBSTRATE HAVING LOW BISPHENOL CONTENT

[75] Inventors: Kazunari Otsubo; Motonobu Ezoe; Hideo Ago; Koji Yamamoto, all of Ichihara, Japan

[73] Assignee: Idemitsu Petrochemical Co., Ltd., Tokyo, Japan

[21] Appl. No.: 191,604

[22] Filed: May 9, 1988

[30] Foreign Application Priority Data

| May 30, 1987 | [JP] | Japan | 62-133524 |
| Jun. 18, 1987 | [JP] | Japan | 62-150101 |
| Jun. 30, 1987 | [JP] | Japan | 62-161325 |
| Nov. 12, 1987 | [JP] | Japan | 62-284232 |

[51] Int. Cl.$^4$ .................................. C08G 63/62
[52] U.S. Cl. ................................ 528/196; 528/493
[58] Field of Search ........................... 528/196, 493

[56] References Cited

U.S. PATENT DOCUMENTS

| 4,680,374 | 7/1987 | Hasuo et al. | 528/196 |
| 4,734,488 | 3/1988 | Hasuo et al. | 528/196 |

*Primary Examiner*—Harold D. Anderson
*Attorney, Agent, or Firm*—Frishauf, Holtz, Goodman & Woodward

[57] ABSTRACT

Polycarbonate for production of disc substrates, a process for efficiently producing said polycarbonate, and a disc substrate made of said polycarbonate are disclosed. This polycarbonate has a low molecular weight polymer content of not more than 3% by weight, an unreacted bisphenol content of not more than 20 ppm, and a methylene chloride content of not more than 20 ppm, and can be obtained by extracting impurity-containing powdery polycarbonate with an organic solvent such as acetone and methyl ethyl ketone. This polycarbonate is particularly suitable for production of high quality disc substrates.

6 Claims, No Drawings

POLYCARBONATE FOR DISC SUBSTRATE HAVING LOW BISPHENOL CONTENT

BACKGROUND OF THE INVENTION

1. Field of the Invention

The present invention relates to polycarbonate for disc substrates, a process for producing said polycarbonate, and a disc substrate made of said polycarbonate. More particularly, it is concerned with high purity polycarbonate, of which the impurity content is greatly decreased and which is useful as a material for production of disc substrates, a process for efficiently producing said high purity polycarbonate, and a disc substrate made of said high purity polycarbonate.

2. Description of Related Art

Polycarbonate is generally used as a material for production of disc substrates such as for optical discs, magnetic discs and so forth.

The conventional polycarbonate, however, when molded and used as a disc substrate, suffers from various problems. For example, (1) adhesion force between the substrate and a recording film is insufficiently low, (2) metals such as iron, gallium and terbium, existing in the recording film are gradually corroded, and (3) a mold is corroded during molding and thus the service life of a stamper is shortened.

As a result of extensive investigations to overcome the above problems encountered in using the conventional polycarbonate as a disc substrate and to produce polycarbonate which exhibits superior performance as a disc substrate and causes no corrosion of a mold to be used in molding, it has been found that the conventional polycarbonate, particularly polycarbonate produced by the phosgene method contains, as impurities, unreacted starting materials, a solvent used, and low molecular weight polymers, and that these impurities are responsible for the above problems.

Based on the above findings, further investigations were made, and it has been found that high purity polycarbonate having a greatly decreased impurity content is obtained by treating polycarbonate containing the above impurities with a ketone such as acetone and methyl ethyl ketone (MEK), and that such high purity polycarbonate is free from the above problems and exhibits excellent performance as a disc substrate.

Furthermore it has been found that if extraction of impurities with an organic solvent such as a ketone, separation of the organic solvent and heat drying of the resulting polycarbonate are separately carried out in each apparatus, fine dust may be entrained in the polycarbonate mixture during transportation thereof from an apparatus to the following apparatus, and that if all the operations are carried out in the single apparatus, polycarbonate having much higher quality results.

SUMMARY OF THE INVENTION

The present invention relates to high purity polycarbonate for use in production of disc substrates, wherein the low molecular weight polymer content is not more than 3% by weight, the unreacted bisphenol content is not more than 20 ppm, and the methylene chloride content is not more than 20 ppm.

The present invention further relates to a process for producing polycarbonate for production of disc substrates, which comprises extracting impurity-containing powdery polycarbonate with ketones at temperatures of from 40° C to the boiling point of each ketone used. This process is hereinafter referred to as "Process (A)".

The present invention further relates to a process for producing polycarbonate for production of disc substrates, which comprises introducing impurity-containing powdery polycarbonate and an organic solvent in a processing container including a solid-liquid contact region and provided with a solid-liquid separation mechanism and a drying mechanism, where the powdery polycarbonate and the organic solvent are brought into contact with each other; separating the organic solvent from the powdery polycarbonate; and then drying the resulting powdery polycarbonate. This process is hereinafter referred to as "Process (B)".

The present invention further relates to a disc substrate made of the above high purity polycarbonate.

DESCRIPTION OF PREFERRED EMBODIMENTS

The polycarbonate of the present invention is of higher purity than the conventional polycarbonate; that is, amounts of impurities contained in the polycarbonate of the present invention are smaller than those of the conventional polycarbonate. In general, the conventional polycarbonate contains various impurities; particularly, the amounts of low molecular weight polymers (e.g., polycarbonate oligomers and the like), unreacted bisphenols (e.g., bisphenol A and the like), and methylene chloride used as a solvent are large. These impurities cause various problems as described above when such impurity-containing polycarbonate is used as a disc substrate.

All the amounts of the above impurities in the polycarbonate of the present invention are small. The low molecular weight polymer content is not more than 3% by weight and preferably not more than 2% by weight; the unreacted bisphenol content is not more than 20 ppm and preferably not more than 10 ppm; and the methylene chloride content is not more than 20 ppm and preferably not more than 15 ppm.

If the low molecular weight polymer content is more than 3% by weight, or the unreacted bisphenol content is more than 20 ppm, adhesion force between the disc substrate and a recording film is decreased. If the methylene chloride content is more than 20 ppm, the recording film is more readily corroded, and furthermore, since a mold is corroded at the time of molding, the service life of a stamper is shortened.

The low molecular weight polymer content as described above means the proportion of polymers obtained by Soxhlet extraction of the polycarbonate being measured, with acetone as a solvent.

The high purity polycarbonate of the present invention can be obtained by various methods. Usually, it can be obtained by extracting generally available impurity-containing powdery polycarbonate with ketones such as acetone and methyl ethyl ketone (MEK). The impurity-containing powdery polycarbonate as used herein is not critical in the method of production thereof; those obtained by various methods can be used. Usually, powdery polycarbonate obtained by the phosgene method, particularly by the interfacial polycondensation method using bisphenols (e.g., bisphenol A) and phosgene as starting materials, and methylene chloride as a solvent, more particularly by the continuous interfacial polycondensation method is suitably used. In addition, powdery polycarbonate obtained by the ester exchange method or the so-called pyridine polymerization method using pyridine as a solvent, among the phosgene method can be used.

The powdery polycarbonate as used herein is not limited to powdery polycarbonate in the strict sense, but it also includes flake-like polycarbonate and so forth. That is, the powdery polycarbonate as used herein includes all powdery polycarbonate, granular polycarbonate, flake-like polycarbonate and so forth, as obtained by the phosgene method and the ester exchange method, but before pelletization.

For example, powdery polycarbonate obtained by the continuous interfacial polycondensation method is usually in a flake form and contains, as impurities, 4 to 8% by weight of low molecular weight polymers (e.g., polycarbonate oligomers and the like), 70 to 150 ppm of unreacted bisphenols (e.g., bisphenol A) and 50 to 150 ppm of methylene chloride used as a solvent.

The high purity polycarbonate of the present invention is obtained by extracting the above impurity-containing powdery polycarbonate with a ketone such as acetone and methyl ethyl ketone. In this extraction, it is preferred that the ketone be used in an amount of 0.5 to 20 times the amount of the powdery polycarbonate, and the temperature be set within the range of from 40° C. to the boiling point of the ketone. This extraction is usually carried out under atmospheric pressure, but can be carried out under pressure. Further, it is possible for the extraction to be carried out with an organic solvent having a weak precipitation effect for polycarbonate, such as toluene and xylene.

The high purity polycarbonate of the present invention can be produced efficiently particularly by the processes (A) and (B) as described above.

In accordance with the process (A), the impurity-containing powdery polycarbonate is subjected to extraction treatment using ketones. There are no special limitations to the type of the ketone being used in the process (A). From a standpoint of ease of separation at the subsequent step, a ketone compound not having a high boiling point, more specifically having a boiling point of not more than 100° C. is preferably used. Specific examples of the ketones are acetone, methyl ethyl ketone (MEK), diethyl ketone and the like.

If, however, hexane, methanol and the like other than the ketones are used as the extraction solvent, the resulting polycarbonate is unsuitable for a disc substrate for the reasons that impurities cannot be removed efficiently and so forth.

In this extraction treatment with ketones, the temperature is chosen from the range of from 40° C. to the boiling point of the ketone used, preferably from 45° C. to the boiling point of the ketone used. If the temperature is less than 40° C., the extraction effect is insufficiently low. The extraction treatment is usually carried out under atmospheric pressure, but can be carried out under pressure.

With regard to the amount of the ketone used in the extraction treatment, it suffices that the ketone is used in such an amount that it is able to come into intimate contact with the impurity-containing powdery polycarbonate. More specifically, the amount of the ketone used is 0.5 to 20 times (by weight), preferably 2 to 5 times (by weight) the amount of the impurity-containing powdery polycarbonate.

The time for the extraction treatment, i.e., the contact time of the powdery polycarbonate and the ketone varies with various factors and cannot be determined unconditionally. The contact time is usually at least 10 minutes and preferably 10 to 120 minutes. From a practical point of view, the contact time is preferably 30 to 60 minutes. Even if the extraction treatment is carried out for a longer time, no additional extraction effect can be expected.

In accordance with the process (A), there can be obtained efficiently polycarbonate which is greatly decreased in the amounts of impurities. For example, when impurity-containing powdery polycarbonate having a low molecular weight polymer content of 4 to 8% by weight, an unreacted bisphenol content of 70 to 150 ppm and a methylene chloride content of about 50 to 150 ppm is subjected to extraction treatment according to the process (A) of the present invention, there is obtained such high purity polycarbonate that the low molecular weight polymer content is not more than 3% by weight, preferably not more than 2% by weight, the unreacted bisphenol content is not more than 20 ppm, and the methylene chloride content is not more than 20 ppm.

Also in the process (B) of the present invention, impurity-containing powdery polycarbonate as described above is used. As this impurity-containing powdery polycarbonate, polycarbonate produced by the phosgene method, particularly from bisphenols (e.g., bisphenol A) and phosgene as starting materials in a solvent of methylene chloride according to the interfacial polycondensation method, more particularly according to the continuous interfacial polycondensation method, or if necessary, further granulated by the kneader method and the hot water granulating method is suitable to use. The impurity-containing polycarbonate has a viscosity average molecular weight of 12,000 to 30,000.

In accordance with the process (B), the impurity-containing powdery polycarbonate is introduced into a processing container along with an organic solvent, said container including a solid-liquid contact region and being provided with a solid-liquid separating mechanism and a drying mechanism. As the organic solvent, various organic solvents can be used as long as they can extract impurities contained in the powdery polycarbonate. Usually, acetone, methyl ethyl ketone, toluene, xylene and the like in which polycarbonate is insoluble or little soluble, that is to say, non-solvents or poor solvents, are suitably used. Particularly suitable are acetone and methyl ethyl ketone.

It suffices that the organic solvent is introduced into the processing container in such an amount that it comes into intimate contact with the whole of the impurity-containing powdery polycarbonate. More specifically, the amount of the organic solvent used is 0.5 to 20 times (by weight, preferably 2 to times the amount of the powdery polycarbonate to be treated.

The above powdery polycarbonate is introduced into the processing container, particularly into the solid-liquid contact region along with the organic solvent. This solid-liquid contact region usually includes a reservoir for the liquid and stirring means provided therein. The powdery polycarbonate and the organic solvent introduced into the solid-liquid contact region are thoroughly stirred by the use of stirring means such as a stirring blade and the like, and are brought into intimate contact with each other, whereby impurities contained in the powdery polycarbonate are extracted in the organic solvent. Contacting conditions vary with various factors and can be determined appropriately. Generally, the temperature is in the range of 40° C. to the boiling point of the organic solvent; the number of revolution of the stirring means is about 1 to 100 rpm, preferably 2 to 10 rpm; and the time is at least 10 minutes, preferably 0.5 to 5 hours.

The above extraction treatment is preferably carried out to control the impurities contained in the polycarbonate so that the low molecular weight polymer content is not more than 3% by weight, the unreacted bisphenol content is not more than 20 ppm, and the methylene chloride content is not more than 20 ppm.

The contact treatment (extraction treatment) is usually carried out under atmospheric pressure, but can be carried out under pressure. Thus, when the contact treatment is carried out under pressure, the solid-liquid contact region should be made a closed system.

In accordance with the process (B), after the contact treatment (extraction treatment) in the solid-liquid contact region of the processing container, the powdery polycarbonate is separated from the organic solvent by the use of the solid-liquid separation mechanism provided in the processing container. The solid-liquid separation mechanism is not critical; various types of mechanisms can be employed. Usually it is a filter plate provided in the bottom of the processing container, particularly in the vicinity of the bottom of the liquid reservoir. Solid-liquid separation may be carried out by allowing a mixture of the powdery polycarbonate and the organic solvent to stand after stirring thereof in the solid-liquid contact region, but it can be carried out by suction filtration.

The powdery polycarbonate from which the impurities have been removed is separated from the organic solvent and left on the above filter plate. In the process (B), the powdery polycarbonate is dried by the use of the drying mechanism provided in the same processing container to completely remove the organic solvent attaching to the polycarbonate. In this drying treatment, although the polycarbonate may be dried by allowing it to stand, it is usually dried by heating at a temperature of about 100° to 150° C. and/or under reduced pressure. Moreover the polycarbonate can be dried by heating it in a stream of inert gas such as nitrogen and the like. It is also effective that the polycarbonate is dried by heating while stirring it on the filter plate by the use of e.g., a stirring blade. The drying mechanism as used herein is usually a heating means and, if necessary, may further include an auxiliary stirring means or a pressure reducing means.

In the process (B), since the above contact treatment (extraction treatment), solid-liquid separation treatment and drying treatment are carried out in a clean room and further in the same processing container, the purified polycarbonate is completely free from contamination with dust.

It is more effective that the operation of discharging the dried polycarbonate from the exit of the processing container and charging it in a container, for example, is automatically carried out in a clean or dust-free room.

The polycarbonate of the present invention is, as described above, of such high quality that the amounts of impurities are greatly decreased. Thus, when the polycarbonate of the present invention is used in production of substrates for optical discs, magnetic discs and the like, there can be obtained various advantages. For example, adhesion between the substrate and a recording film is good; there is no danger of the recording film being corroded by the substrate; a mold is not corroded by the polycarbonate at the time of molding thereof and thus the service life of a stamper is long.

Thus the polycarbonate of the present invention is of high practical value as a material for production of disc substrates and can be expected to be widely used.

The polycarbonate of the present invention can be efficiently produced by the process (A) of the present invention as described above.

The polycarbonate of the present invention can also be efficiently produced by the process (B) of the present invention as described above. In accordance with the process (B), since extraction treatment, separation of an organic solvent and drying treatment can be carried out in the same processing container, impurities contained in the starting polycarbonate material are removed completely and at the same time, contamination of the polycarbonate product with dust is prevented.

Thus the processes (A) and (B) are of high practical value as a process for production of the polycarbonate of the present invention.

Furthermore, a disc substrate made of the polycarbonate of the present invention has various advantages as described above, for example, adhesion between the substrate and a recording film is good, and there is no danger of the recording film being corroded by the substrate.

Thus the disc substrate is suitable for production of optical discs, magnetic discs and the like.

The present invention is described in greater detail with reference to the following examples.

EXAMPLE 1

To 100 kg of flake-like polycarbonate having a low molecular weight polymer content of 4% by weight, an unreacted bisphenol A content of 100 ppm and a methylene chloride content of 100 ppm were added 225 kg of acetone, and the resulting mixture was stirred at 50° C. for one hour to effect contact treatment (extraction treatment).

Then, the acetone was removed, and the polycarbonate was dried at a temperature of 120° C. under a reduced pressure of 30 to 1 mmHg for 20 hours. The amounts of the impurities contained in the flake-like polycarbonate thus purified are shown in Table 1.

To the purified flake-like polycarbonate were added 4 ppm (calculated as phosphorus) of a phosphorus-based antioxidant and 200 ppm of an aliphatic ester. The resulting mixture was pelletized by the use of an extruder, and the pellets thus obtained were molded into a disc substrate having a diameter of 13 cm by the use of an injection machine. After 5,000 shots in this disc injection molding, the cloudness of the mirror surface of a mold was determined with the eye and the stamper life was evaluated in terms of the cloudness. The results are shown in Table 1.

On the disc substrate thus obtained was formed a three layer structure magneto-optic media consisting of a silicon oxide ($SiO_x$) layer (thickness: 800 Å), a metal (Tb, Fe, Co) layer (thickness: 1,000 Å) and a silicon oxide ($SiO_x$) layer (thickness: 800 Å) by the sputtering method, to produce an optical disc. The performance of the optical disc was evaluated by measuring adhesion (adhesion between the magneto-optic media and the substrate) and corrosive properties by the following testing methods. The results are shown in Table 1.

Adhesion Test

The optical disc was allowed to stand for 100 hours in an atmosphere of temperature 90° C. and relative humidity 90%. At the end of the period, the optical disc was subjected to the checked pin-hole test (crosscut test) using a cellophane tape. Adhesion properties were indicated in terms of the value calculated from the following equation:

$$\frac{\text{Area of Remaining Magneto-optic Media after Test}}{\text{Area of Magneto-optic Media Tested}} \times 100 \, (\%)$$

Corrosion Test

The optical disc was allowed to stand for 300 hours in an atmosphere of temperature 60° C. and relative humidity 90%. At the end of the period, the number of pin-holes due to corrosion in an area of 250 μm×200 μm magnified by 1,000 under an optical microscope was counted. Corrosion properties were indicated in terms of the number of pin-holes.

EXAMPLE 2

The procedure of Example 1 was repeated with the exception that the extraction treatment using acetone was carried out at the boiling point (about 56.5° C.) of acetone. The results are shown in Table 1.

EXAMPLE 3

The procedure of Example 1 was repeated with the exception that the extraction treatment using acetone was carried out at the boiling point (about 56.5° C.) of acetone for 30 minutes. The results are shown in Table 1.

EXAMPLE 4

The procedure of Example 1 was repeated with the exception that the extraction treatment was performed twice using toluene in place of the acetone, and after removal of the toluene, the polycarbonate was dried under reduced pressure for 40 hours. The results are shown in Table 1.

EXAMPLE 5

The procedure of Example 1 was repeated with the exception that the extraction treatment was performed using methyl ethyl ketone in place of the acetone, and after removal of the methyl ethyl ketone, the polycarbonate was dried under reduced pressure for 40 hours. The results are shown in Table 1.

COMPARATIVE EXAMPLE 1

The procedure of Example 1 was repeated with the exception that the extraction treatment using acetone was not applied. The results are shown in Table 1.

COMPARATIVE EXAMPLE 2

The procedure of Example 1 was repeated with the exception that the extraction treatment was performed using 100 kg of acetone at 25° C. The results are shown in Table 1.

COMPARATIVE EXAMPLE 3

The procedure of Example 1 was repeated with the exception that flake-like polycarbonate having a low molecular weight polymer content of 2% by weight, an unreacted bisphenol A content of 100 ppm and a methylene chloride content of 100 ppm was used as the impurity-containing powdery polycarbonate, and the extraction treatment using acetone was not applied. The results are shown in Table 1.

COMPARATIVE EXAMPLE 4

The procedure of Example 1 was repeated with the exception that flake-like polycarbonate having a low molecular weight polymer content of 4% by weight, an unreacted bisphenol A content of 10 ppm and a methylene chloride content of 10 ppm was used as the impurity-containing powdery polycarbonate, and the extraction treatment using acetone was not applied. The results are shown in Table 1.

COMPARATIVE EXAMPLE 5

The procedure of Example 1 was repeated with the exception that flake-like polycarbonate having a low molecular weight polymer content of 2% by weight, an unreacted bisphenol A content of 10 ppm and a methylene chloride content of 100 ppm was used as the impurity-containing powdery polycarbonate, and the extraction treatment using acetone was not applied. The results are shown in Table 1.

COMPARATIVE EXAMPLE 6

The procedure of Example 1 was repeated with the exception that the extraction treatment was performed using hexane in place of the acetone at a temperature of 40° C. The results are shown in Table 1.

COMPARATIVE EXAMPLE 7

The procedure of Example 1 was repeated with the exception that the extraction treatment was performed using methanol in place of the acetone at a temperature of 40° C. The results are shown in Table 1.

COMPARATIVE EXAMPLE 8

The procedure of Example 1 was repeated with the exception that flake-like polycarbonate having a low molecular weight polymer content of 4% by weight, an unreacted bisphenol A content of 10 ppm and a methylene chloride content of 10 ppm was used as the impurity-containing powdery polycarbonate, and the extraction treatment using acetone was not applied. The results are shown in Table 1.

COMPARATIVE EXAMPLE 9

The procedure of Example 1 was repeated with the exception that flake-like polycarbonate having a low molecular weight polymer content of 1.5% by weight, an unreacted bisphenol A content of 10 ppm and a methylene chloride content of 40 ppm was used as the impurity-containing powdery polycarbonate and the extraction treatment using acetone was not applied. The results are shown in Table 1.

COMPARATIVE EXAMPLE 10

The procedure of Example 1 was repeated with the exception that flake-like polycarbonate having a low molecular weight polymer content of 1.5% by weight, an unreacted bisphenol A content of 30 ppm and a methylene chloride content of 10 ppm was used as the impurity-containing powdery polycarbonate and the extraction treatment using acetone was not applied. The results are shown in Table 1.

TABLE 1

| Run No. | Low Molecular Weight Polymer Content (wt %) | Unreacted Bisphenol A Content (ppm) | Methylene Chloride Content (ppm) | Adhesion Properties (%) | Corrosion Properties | Stamper Life (Cloudness) |
|---|---|---|---|---|---|---|
| Example 1 | 2.0 | 10 | less than 10 | 98 | 0 | No cloudness |
| Example 2 | 1.0 | 10 | less than 10 | 100 | 0 | No cloudness |
| Example 3 | 1.5 | 10 | less than 10 | 95 | 0 | No cloudness |
| Example 4 | 1.5 | 10 | 10 | 96 | 0 | No cloudness |
| Example 5 | 2.0 | 10 | 10 | 97 | 0 | No cloudness |
| Comparative Example 1 | 4.0 | 100 | 100 | 0 | 40 | High cloudness |
| Comparative Example 2 | 3.5 | 50 | 20 | 5 | 25 | High cloudness |
| Comparative Example 3 | 2.0 | 100 | 100 | 10 | 25 | High cloudness |
| Comparative Example 4 | 4.0 | 10 | 10 | 5 | 25 | High cloudness |
| Comparative Example 5 | 2.0 | 10 | 100 | 16 | 40 | Intermediate cloudness |
| Comparative Example 6 | 3.8 | 78 | less than 10 | 10 | 35 | High cloudness |
| Comparative Example 7 | 3.7 | 80 | less than 10 | 12 | 30 | High cloudness |
| Comparative Example 8 | 4.0 | 10 | 10 | 14 | 25 | Intermediate cloudness |
| Comparative Example 9 | 1.5 | 10 | 40 | 23 | 35 | Intermediate cloudness |
| Comparative Example 10 | 1.5 | 30 | 10 | 25 | 34 | Intermediate cloudness |

The amounts of the impurities in the purities polycarbonate in Table 1 were measured by the following methods:

Low Molecular Weight Polymer Content

A polycarbonate sample was pulverized, and 15 g of a polycarbonate portion having passed through a 100 mesh metal screen was placed in a cylindrical filter paper No. 84 (28 mm×100 mm). Soxhlet extraction using 300 ml of acetone was performed for 8 hours in such a manner that 20 ml of the acetone was refluxed once per 3–4 minutes. Then, 300 ml of the acetone was evaporated, and the amount of the residue was measured and indicated as the low molecular weight polymer content.

Unreacted Bisphenol A Content

After the above Soxhlet extraction for measurement of the low molecular weight polymer content, unreacted bisphenol A extracted in the acetone was quantitatively determined by liquid chromatography.

Methylene Chloride Content

A polycarbonate sample was dissolved in 1,2-dichloroethane, and methylene chloride was quantitatively determined by gas chromatography (FID).

EXAMPLE 6

A mixture of 200 kg of flake-like polycarbonate (average particle diameter: 1 mm; viscosity average molecular weight Mv: 15,000) having a low molecular weight polymer content of 4% by weight and an unreacted bisphenol A content of 100 ppm and 500 kg of acetone was introduced into a filter drier (WD Filter manufactured by Nippon Senshoku Kiki Co., Ltd.) having an inner volume of 1.4 m$^3$ and a filter area of 1.0 m$^2$ (having a 100 micron filter plate) in a clean or dust-free atmosphere. The mixture was then stirred for one hour at a temperature of 55° C. and a number of revolutions of 8 rpm. Then, the acetone was withdrawn from the filter drier through the filter plate. Polycarbonate flakes remaining in the filter drier was dried as such for 20 hours at a temperature of 140° C. under a reduced pressure of 1 to 30 mmHg. The polycarbonate flakes thus dried were withdrawn from the bottom of the filter drier in a clean or dust-free atmosphere. The number of dusts having a size of not less than 0.5 μm was measured and found to be 3.5×10$^3$ per gram of the polycarbonate flake.

The low molecular weight polymer content, unreacted bisphenol A content and residual methylene chloride content of the polycarbonate flake are shown in Table 2.

The flake-like polycarbonate thus purified was measured for adhesion and corrosion properties, and also for stamper life (cloudness) in the same manner as in Example 1. The results are shown in Table 2.

EXAMPLE 7

A mixture of 200 kg of the same polycarbonate as used in Example 6 and 500 kg of toluene was stirred in the same manner as in Example 6. After removal of the toluene, 500 kg of fresh toluene was added, and the resulting mixture was stirred for one hour in the same manner as above. Thereafter, the toluene was removed in the same manner as above. The resulting polycarbonate was dried at a temperature of 140° C. under a reduced pressure of 1 to 300 mmHg for 40 hours. After drying, the polycarbonate flakes were withdrawn in a clean or dust-free atmosphere and the polycarbonate thus purified was measured for adhesion and corrosion properties and also for stamper life (cloudness) in the same manner as in Example 1. The results are shown in Table 2.

EXAMPLE 8

The procedure of Example 6 was repeated with the exception that methyl ethyl ketone was used in place of the acetone and the polycarbonate was dried at a temperature of 140° C. under a reduced pressure of 1 to 30 mmHg for 40 hours. The results are shown in Table 2.

COMPARATIVE EXAMPLE 11

The procedure of Example 6 was repeated with the exception that pure water was used in place of the acetone. The results are shown in Table 2.

COMPARATIVE EXAMPLE 12

The procedure of Example 6 was repeated with the exception that the mixture of polycarbonate and acetone was stirred in a stirring vessel having an inner volume of 1 m$^3$ in place of the WD filter, the resulting slurry was separated into solid and liquid fractions by the use of a centrifugal separator, and then the polycarbonate was dried for 20 hours at a temperature of 140° C. under a reduced pressure of 1 to 30 mmHg by the use of a paddle type drier. The results are shown in Table 2.

TABLE 2

| Run No. | Extraction Solvent | Apparatus | Amounts of Impurities in Purified Polycarbonate ||||  Adhesion Properties | Corrosion Properties |
|---|---|---|---|---|---|---|---|---|
| | | | Low Molecular Weight Polymer Content (wt %) | Unreacted Bisphenol A Content (ppm) | Methylene Chloride Content (ppm) | Number of Dusts (per gram) | | |
| Example 6 | Acetone | WD filter | 1.0 | 10 | less than 10 | 3.5 × 10$^3$ | 100 | 0 |
| Example 7 | Toluene | WD filter | 1.5 | 10 | 10 | 4.1 × 10$^3$ | 96 | 0 |
| Example 8 | MEK* | WD filter | 2.0 | 10 | 10 | 3.8 × 10$^3$ | 97 | 0 |
| Comparative Example 11 | pure water | WD filter | 4.0 | 80 | 50 | 10.2 × 10$^3$ | 0 | 40 |
| Comparative Example 12 | Acetone | Stirring vessel | 1.2 | 10 | less than 10 | 51.2 × 10$^3$ | 95 | 5 |

*MEK = methyl ethyl ketone

What is claimed is:

1. Polycarbonate for use in production of a disc substrate, having a low molecular weight polymer content of not more than 3% by weight, an unreacted bisphenol content of not more than 20 ppm, and a methylene chloride content of not more than 20 ppm.

2. The polycarbonate as claimed in claim 1 which has a low molecular weight polymer content of not more than 2% by weight, an unreacted bisphenol content of not more than 10 ppm, and a methylene chloride content of not more than 15 ppm.

3. A disc substrate made of polycarbonate having a low molecular weight polymer content of not more than 3% by weight, an unreacted bisphenol content of not more than 20 ppm, and a methylene chloride content of not more than 20 ppm.

4. The disc substrate as claimed in claim 3 wherein the polycarbonate has a low molecular weight polymer content of not more than 2% by weight, an unreacted bisphenol content of not more than 10 ppm, and a methylene chloride content of not more than 15 ppm.

5. The polycarbonate as claimed in claim 1 which is in the form of flake-like particles.

6. The polycarbonate as claimed in claim 2 which is in the form of flake-like particles.

* * * * *